United States Patent
Adigrat et al.

(10) Patent No.: US 9,416,045 B2
(45) Date of Patent: Aug. 16, 2016

(54) METHOD OF MANUFACTURING PREFORMS FOR OPTICAL FIBRES HAVING LOW WATER PEAK

(71) Applicant: Prysmian S.p.A., Milan (IT)

(72) Inventors: Antonio Adigrat, Milan (IT); Valeria Caronna, Milan (IT); Franco Cocchini, Salerno (IT); Antonio Collaro, Torre del Greco (IT); Stefano Grieco, Milan (IT); Ida Nivelli, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 14/758,018

(22) PCT Filed: Dec. 28, 2012

(86) PCT No.: PCT/EP2012/077036
§ 371 (c)(1),
(2) Date: Jun. 26, 2015

(87) PCT Pub. No.: WO2014/101948
PCT Pub. Date: Jul. 3, 2014

(65) Prior Publication Data
US 2015/0336840 A1    Nov. 26, 2015

(51) Int. Cl.
*C03B 37/018*    (2006.01)
*C03B 37/027*    (2006.01)
(Continued)

(52) U.S. Cl.
CPC ......... *C03B 37/01853* (2013.01); *C03B 37/014* (2013.01); *C03B 37/018* (2013.01); *C03B37/0146* (2013.01); *C03B 37/01446* (2013.01); *C03B 37/027* (2013.01); *G02B 6/02* (2013.01); *C03B 2203/23* (2013.01); *C03B 2203/24* (2013.01)

(Continued)

(58) Field of Classification Search
CPC ............................ C03B 37/018; C03B 37/027
USPC .......................................................... 65/421
See application file for complete search history.

(56) References Cited

U.S. PATENT DOCUMENTS 4,579,571 A * 4/1986 Hicks, Jr. .......... C03B 37/01446
                                                          65/397
6,157,758 A * 12/2000 Abe .................. C03B 37/01211
                                                          385/123

(Continued)

FOREIGN PATENT DOCUMENTS

EP    1990324 A2    11/2008
EP    1544175 A1    12/2012

(Continued)

OTHER PUBLICATIONS

International Search Report of corresponding International Application No. PCT/EP2012/077036; date mailed: Aug. 13, 2013; 11 pages.

*Primary Examiner* — Mark Halpern
(74) *Attorney, Agent, or Firm* — Shumaker, Loop & Kendrick, LLP (57) ABSTRACT

A method of manufacturing an optical fibre preform comprising: providing a glass core rod comprising a central core region of radius a and an inner clad region of external radius b to define a first core-to-clad ratio a/b; forming an intermediate glass preform comprising an intermediate clad region surrounding the inner clad region of the glass rod and having an external radius c to define a second core-to-clad ratio a/c, and overcladding the intermediate glass preform by forming an overclad region surrounding the intermediate clad region to form an optical fibre preform, wherein the first core-to-clad ratio a/b is equal to or less than 0.40 and the second core-to-clad ratio a/c is of from 0.20 to 0.25.

10 Claims, 3 Drawing Sheets

(51) Int. Cl.
*C03B 37/014* (2006.01)
*G02B 6/02* (2006.01)

(56) References Cited

U.S. PATENT DOCUMENTS 6,681,074 B1 * 1/2004 Abe .................. C03B 37/01225
385/141
2007/0286560 A1 * 12/2007 Nakamura ......... G02B 6/02038
385/124
2010/0122558 A1 * 5/2010 Jewell ................ C03B 37/0146
65/427
2012/0321891 A1  12/2012 Nunome

FOREIGN PATENT DOCUMENTS

| JP | 2001253726 A | 6/2005 |
| WO | 01/48722 A1 | 7/2001 |
| WO | 2012/010212 A1 | 1/2012 |

* cited by examiner

METHOD OF MANUFACTURING PREFORMS FOR OPTICAL FIBRES HAVING LOW WATER PEAK

This application is a 371 of PCT/EP2012/077036 filed 28 Dec. 2012

FIELD OF THE INVENTION

The present invention relates to a process of manufacturing an optical fibre preform and in particular to a process of manufacturing a preform for optical transmission fibres having low water peak.

TECHNICAL BACKGROUND

Wavelength division multiplexing (WDM) technology and the more recent dense wavelength division multiplexing technology (DWDM) have pushed manufacturers of optical transmission fibres to produce fibres having a very small optical attenuation across a broad wavelength region of the transmission spectrum. A particular problem that has been dealt with in the last decade is the attenuation due to the absorption by the optical fibre, during its manufacturing, of hydroxyl radicals (—OH) and/or $H_2O$ molecules present in the optically active region of the fibre. The —OH groups and water can be formed during manufacturing of optical fibre preforms when the latter are exposed to hydrogen, which can be available from various sources. Contamination from hydroxyl radicals or water causes a linear attenuation at 1380 nm, visible in the attenuation spectrum as a peak generally referred to as the "water peak".

A common procedure to obtain a glass preform to be drawn down to an optical fibre of typical diameter of about 125 µm comprises a first process for producing a core rod of solid glass, also indicated as core cane, and a second process in which an overcladding is added to the core rod by a suitable process, e.g. by deposition of soot about the core rod or by jacketing the core rod in a glass tube (rod-in-tube—RIT—technology).

WO 01/47822 relates to a method of fabricating a cylindrical glass body for use in manufacturing an optical fibre with low water peak, the method comprising the steps of: forming a consolidated glass precursor body for use in manufacturing an optical fibre preform, said precursor body comprising at least a partial core region of said preform; exposing said glass precursor body to deuterium gas, and forming additional cladding on said precursor body to form an optical fibre preform. The precursor body is a glass core cane comprising a core region and at least a portion of the glass cladding region. Prior to additional overclad soot being added to the core cane, the core cane is suspended within a furnace and treated with deuterium for a time and temperature which is sufficient to prevent rewetting of the consolidated glass core cane.

The soot precursor body, especially when made by outside vapour deposition (OVD), vapour axial deposition (VAD), typically has a core region surrounded by a near clad region, also indicated as inner clad region, often made of pure silica. Optionally, the inner cladding region comprises one or more layers of doped silica. The resultant precursor body is then dried and consolidated to form a core glass body. A stretching often follows the consolidation in order to reduce the diameter of the glass body which is then severed into a plurality of core rods. Alternatively core rods may also be made by inside deposition processes such as Modified or Furnace Chemical Vapour Deposition (MCVD/FCVD), or Plasma Chemical Vapour Deposition (PCVD).

A parameter that is often used as indicative of the cost and performance of the produced optical fibre is the core-to-clad ratio of a glass core rod, a/b, where a is the radius of the core region of the core rod and b is the external radius of the inner clad region surrounding the core region. The larger the value of a/b, the higher can be the yield of the manufacturing process since more core rods can be obtained from a single soot preform.

US 2011/0023551 discloses a method of fabricating core rod sections useable for the production of finished optical fibre preforms. The method is said to allow an increase of the cladding to core ratio, indicated with D/d. The disclosed method comprises inserting two or more core body pieces end-to-end axially inside a glass cylinder, thereby defining joints between adjacent ones of the inserted core body pieces; mounting the glass cylinder with the contained core body pieces vertically in a region of a furnace; heating the glass cylinder and core body pieces together in the furnace, thereby elongating the cylinder and the core body pieces contained in the cylinder; collapsing the elongated cylinder so as to form a finished core rod; and cutting the finished core rod at one or more positions along the length of the core rod that coincide with the joints between adjacent ones of the core body pieces, thereby yielding a number of core rod sections one or more of which are useable for the production of optical fiber preforms. The core body pieces have a D/d of four or less, whereas the finished core rod is formed with a D/d ratio of more than five.

WO 2012/010212 describes a bend-resistant optical fibre having a core region and a cladding region surrounding the core region and comprising a void-containing annular layer doped with fluorine. The fluorine doping can be performed during the consolidation process following a soot deposition of a silica layer over the core blank of a preform.

SUMMARY OF THE INVENTION

Although the RIT process is sometimes preferred because it less prone to the introduction of hydrogen contamination at the interface between the core rod and the overcladding, a direct overcladding by soot deposition can significantly reduce manufacturing costs when compared to a RIT process.

Inventors have realised that an optical fibre with low water peak can be obtained from a core rod with a large core-to-clad ratio by carrying out an intermediate cladding process, in which an intermediate glass preform having a second core-to-clad ratio smaller than the first core-to-clad ratio is formed, and then completing the overcladding to form an optical fibre preform. The core rod has a first core-to-clad ratio equal to or larger than 0.34, in some preferred embodiments equal to or larger than 0.38. Preferably, the first core-to-clad ratio is equal to or smaller than 0.40.

The intermediate glass preform has a second core-to-clad ratio of from 0.20 to 0.25.

According to an aspect consistent with the present disclosure, a method of manufacturing an optical fibre preform is provided, the method comprising:

providing a glass core rod comprising a central core region of radius a and an inner clad region of external radius b to define a first core-to-clad ratio a/b;

forming an intermediate glass preform comprising an intermediate clad region surrounding the inner clad region of the glass rod and having an external radius c to define a second core-to-clad ratio a/c, and overcladding the intermediate glass preform by forming an overclad region surrounding the intermediate clad region to form an optical fibre preform, wherein the first core-to-clad ratio a/b is equal to or less than 0.40 and the second core-to-clad ratio a/c is of from 0.20 to 0.25.

Preferably, a/b is of from 0.34 to 0.40. In some preferred embodiments, a/b is of from 0.38 to 0.40.

Preferably, forming an intermediate glass preform comprises:
depositing soot material around the glass core rod by a flame hydrolysis process to form a soot intermediate clad layer, and
heating to consolidate the deposited soot intermediate clad layer to form an intermediate glass preform.

Preferably, the soot material forming a soot intermediate clad layer is silica soot.

Preferably, the silica soot is to form a intermediate clad region of pure silica.

Preferably, the flame hydrolysis deposition process is an outside vapour deposition process.

Preferably, the inner clad region of the glass core rod is of pure silica.

In some preferred embodiments, overcladding the intermediate glass preform comprises:
depositing soot material around the intermediate glass preform by a flame hydrolysis process to form a soot overclad layer, and
heating to consolidate the soot overclad layer so as to form an optical fibre preform.

Preferably, the flame hydrolysis deposition process for the deposition of the soot overclad layer is an outside vapour deposition process.

Preferably, heating to consolidate the partially porous intermediate preform comprises exposing the partially porous intermediate preform to a consolidation hot zone of a furnace body while rotating the intermediate preform about its longitudinal axis.

Preferably, heating to consolidate the partially porous optical fibre preform comprises exposing the partially porous optical fibre preform to a consolidation hot zone of a furnace body while rotating the intermediate preform about its longitudinal axis.

A further aspect consistent with the present disclosure relates to a method of manufacturing an optical fibre, the method comprising:
providing a glass core rod comprising a central core region of radius a and an inner clad region of external radius b to define a first core-to-clad ratio a/b;
forming an intermediate glass preform comprising an intermediate clad region surrounding the inner clad region of the glass rod and having an external radius c to define a second core-to-clad ratio a/c;
overcladding the intermediate glass preform by forming an overclad region surrounding the intermediate clad region to form an optical fibre preform, and
drawing the optical fibre preform to fabricate an optical fibre,
wherein the first core-to-clad ratio a/b is equal to or less than 0.40 and the second core-to-clad ratio a/c is of from 0.20 to 0.25.

Optical fibres obtained from optical fibre preforms realised by the method consistent with some embodiments of the present disclosure exhibited attenuation at 1383 nm of less than 0.30 dB/km.

BRIEF DESCRIPTION OF THE DRAWINGS

The present invention will now be described in more detail hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

The optical fibre preform to be obtained by the method consistent with the present disclosure is preferably used for the manufacturing of a single-mode optical fibre designed for optical transmission systems.

According to some preferred embodiments consistent with the present disclosure, the method is intended to produce optical fibre preforms for single-mode optical fibres having a mode field diameter (MFD) at 1310 nm of 8.6 to 9.5 µm with a manufacturing tolerance of ±0.6 µm, thereby meeting the specifications of some common standards ITU-T for single mode optical transmission, such as G. 652. More preferably, optical fibre preforms are to produce single mode optical fibres with MFD of 9.0±0.6 µm.

Figure 1:
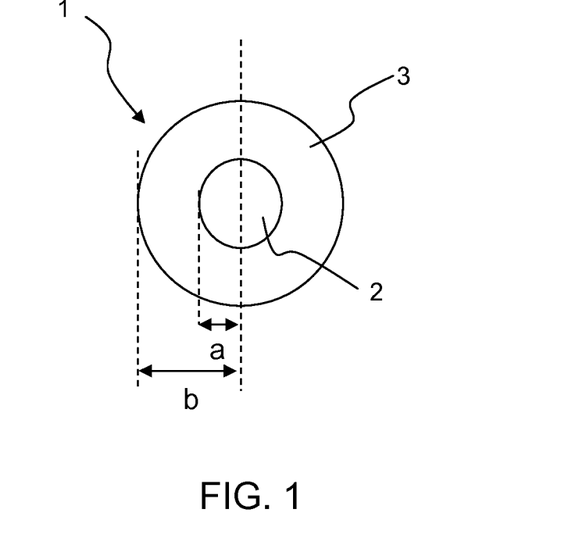
FIG. 1 is a schematic diagram of a cross-sectional view of a glass core rod with first core-to-clad ratio a/b.

In the method of manufacturing an optical fibre preform consistent with the present disclosure and according to some preferred embodiments, a core rod of solid glass is provided, wherein the core rod comprises a central core region and an inner clad region surrounding the core region. FIG. 1 is a schematic diagram of a cross-sectional view of a glass core rod 1 comprising a central core region 2 of radius a and a surrounding inner clad region 3 of external radius b. In an embodiment, the inner clad region 3 surrounds and is in contact with core region 2.

A large core-to-clad ratio (a/b) of the glass core rod 1 would offer advantages in terms of manufacturing efficiency and yield. However, the inventors have experimentally observed that optical fibres made from OVD core rods having a/b larger than 0.34, if completed by a direct soot overcladding by OVD, exhibit an optical attenuation at 1380-1383 nm of more 0.34 dB/km, a value non compliant with some of the ITU-T Recommendations for single-mode transmission.

Inventors have realised that an optical fibre with a low water peak can be obtained from a core rod having a large first core-to-clad ratio by using a multi-stage cladding process, in which in a first stage an intermediate glass preform having a second core-to-clad ratio smaller than the first core-to-clad ratio is formed and a second stage completes the overcladding to form an optical fibre preform. The intermediate glass preform comprises an intermediate clad region surrounding the inner clad region of the core rod. Radial thickness of the intermediate clad layer is selected so as to obtain a second core-to-clad ratio, a/c, of from 0.20 to 0.25, where c is the external radius of the intermediate clad region.

It has been found that cladding the core rod by forming an intermediate clad region of relatively small thickness compared to the thickness of the total clad region of the optical fibre preform allows the use of core rods with relatively large core-to-clad ratios.

Referring back to FIG. 1, the core rod has a first core-clad-ratio, a/b, equal to or larger than 0.34, preferably larger than 0.38. Preferably, a/b is equal to or smaller than 0.4. In some preferred embodiments, a/b is of from 0.34 to 0.4.

Figure 2:
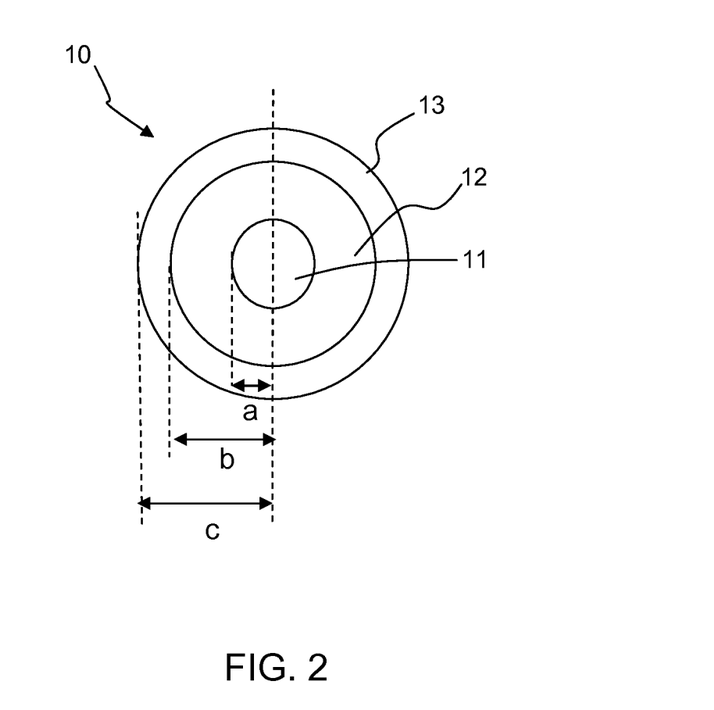
FIG. 2 is a schematic diagram of a cross-sectional view of intermediate glass preform with second core-to-clad ratio a/c.

FIG. 2 is a schematic diagram of a cross-sectional view of an intermediate glass preform 10 comprising a central core region 11 of radius a, an inner clad region 12 of external radius b and an intermediate clad region 13 with external radius c. The radial thickness of the intermediate clad region and thus the radius c is selected so as to obtain a second core-to-clad ratio a/c of from 0.20 to 0.25.

Preferably, both the intermediate clad region and the overclad region are formed on the glass core rod and on the glass intermediate preform, respectively, by direct soot coating.

In some preferred embodiments, soot material deposited for the formation of the intermediate clad region varies from about 5% to less than 15% of the total soot material necessary for the overcladding of the core rod. Inventors have found that deposition by flame hydrolysis of a relatively low amount of soot material around the core rod followed by consolidation of the deposited soot material leads to the manufacture of an optical fibre preform from which a low water peak fibre is obtained.

Without wishing to be bound by any theory or explanation, it is thought that a small amount of soot clad material for the formation of the intermediate clad region can allow an efficient removal of the —OH impurities from the outside surface of the core rod and/or (re-) wetting of the very external layers of the core rod can be reduced due to the relatively short deposition.

Inventors have observed that an a/c ratio not larger than 0.25 may reduce environmental impact of the optical fibre production because, in the formation of the final optical preform, a dehydration process of the overclad soot can be shortened or, under certain circumstances, omitted and/or efficiency of the deposition process of the overclad soot region can be increased by allowing a higher deposition rate for the soot overclad layer, for example by using more than one burner.

A second core-to-clad ratio smaller than 0.20 may exhibit the shortcomings of forming a excessively thick soot layer around the core rod, namely a significant presence of water contamination in the proximity of the outer surface of the core rod.

Preferably, the glass core rod is made of a silica-based material. Preferably, the core region has a positive relative refractive index with respect to the refractive index of silica and it is preferably made of silica doped with a doping element that increase the refractive index, such as germanium, so as to form a step-index profile with positive refractive index relative to pure silica. It is to be understood that a glass core rod with a core region having a step profile, rounded-step profile, an alpha profile or being made of a plurality of sub-regions having positive relative refractive index are intended to be included within the scope of the present disclosure. In some embodiments, the core profile may exhibit a central dip surrounded by a region of relative positive refractive index. Preferably, the core profile is selected so as to obtain an optical fibre with a MFD of 9.0±0.6 µm.

The inner clad region has a lower index of refraction than the central core region and is made preferably of non intentionally doped silica, referred in the present description and claims to pure silica.

In an embodiment, the glass core rod is obtained from a soot preform formed using a flame hydrolysis deposition process, preferably an OVD process, the preform being then sintered (i.e. consolidated) to form a core rod of solid glass. Other flame hydrolysis processes can be used to form the core rod, such as vapour-phase axial deposition (VAD).

In another embodiment, the glass core rod is obtained from an inside vapour deposition process, preferably a process selected from the group consisting of modified chemical vapour deposition (MCVD), furnace chemical vapour deposition (FCVD), and plasma-enhanced chemical vapour deposition (PCVD).

In a preferred embodiment, the intermediate clad region is made of pure silica.

Preferably, forming the intermediate glass preform comprises: depositing a soot intermediate clad layer surrounding the glass core rod to form a partially porous intermediate preform with an external soot layer, and consolidating the partially porous intermediate preform into a intermediate glass preform.

Preferably, deposition of a soot intermediate layer is realised by a flame hydrolysis process of silica-based soot over the core rod. In an embodiment, the core rod is mounted on an OVD horizontal lathe and silica soot is deposited on the outside of a rotating core rod acting as a mandrel in a standard OVD process.

Consolidating the partially porous intermediate preform comprises exposing the preform to temperatures higher than the glass transition temperature of the soot material in a consolidation furnace to convert the deposited external soot layer into solid glass.

In some preferred embodiments, the consolidation process is preceded by a dehydration process of the partially porous intermediate preform.

Figure 3A:
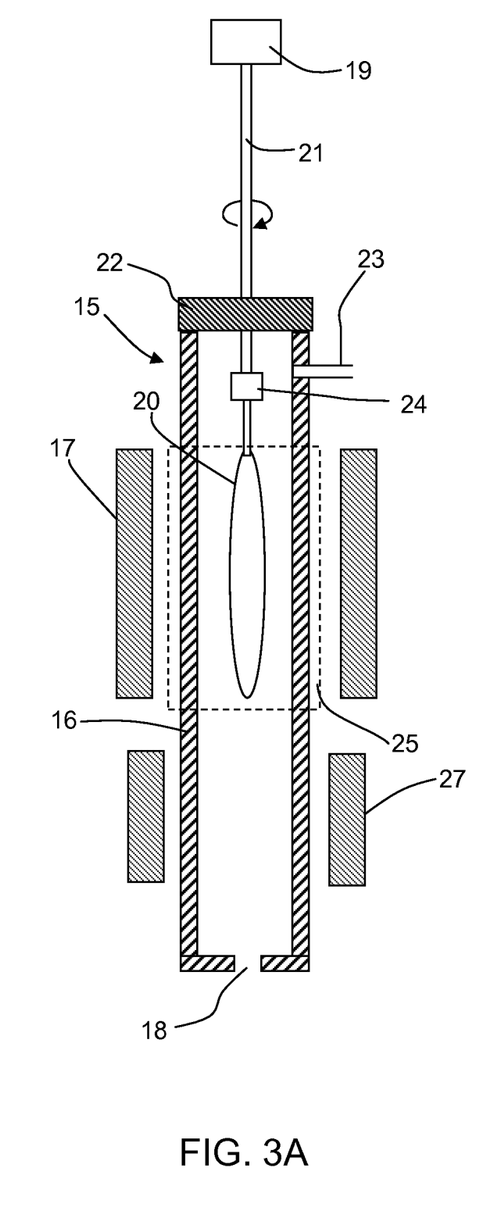
FIGS. 3A and 3B schematically represent a dehydration (FIG. 3A) and consolidation process (FIG. 3B) for a partially porous intermediate preform in a dehydration/consolidation furnace, according to an embodiment consistent with the present disclosure.
Figure 3B:
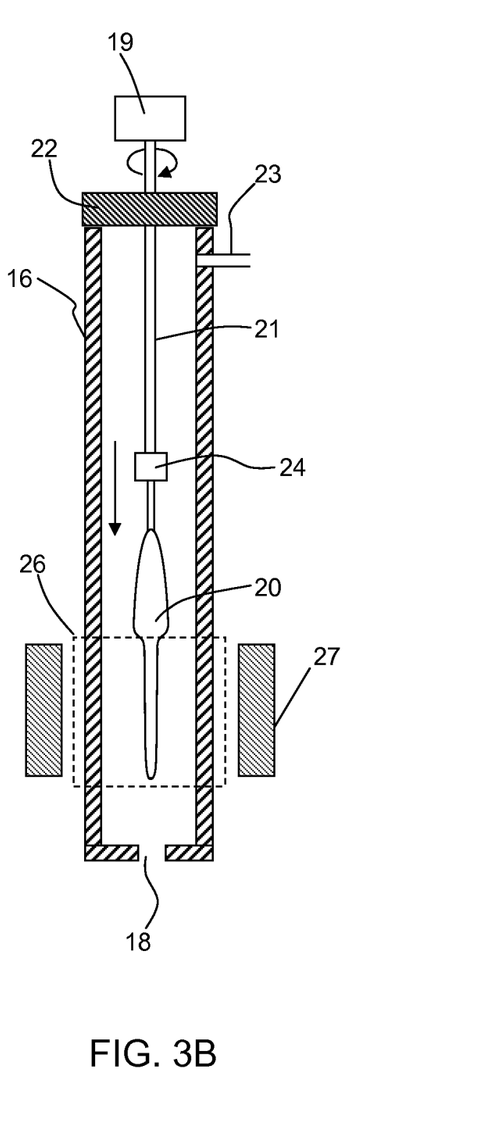

FIGS. 3A and 3B schematically represent two main stages of a process of forming a solid glass intermediate preform from a partially porous intermediate preform in a dehydration and consolidation furnace assembly shown in a partial transverse cross-sectional view. The furnace assembly comprises a standard consolidation furnace 15, comprising a main furnace body 16, e.g. a cylindrical muffle tube, configured to house a preform and having a gas inlet opening 18 for the supply of carrier gases, which are discharged from an outlet 23. The partially porous intermediate preform 20 is hung up by a handle 24 to a lower end of a supporting rod 21 that enters the cavity of the furnace body through a hole in a top hat 22 that acts as closure lid of the main furnace body so that, when the preform is completely inserted, as shown in FIG. 3A, the top hat 22 prevents gases and heat from leaking out from the top of the furnace main body. The upper end of the supporting rod 21 is operatively connected to a moving system 19 that allows a translational movement (up and down) along the furnace main body and a rotation around the longitudinal axis of the connecting rod and consequently of the preform.

FIG. 3A represents a dehydration process preceding the consolidation of the preform. A first heater 17 is placed in the proximity of the outer surface of the main body 16. For example, the first heater 17 has a ring shape and is attached to the outer circumference of the cylindrical muffle tube constituting the main body of the furnace. The first heater defines a first heating zone, usually at a temperature of nearly 1100° C., for dehydration of the porous layers of the preform. Preform 20 is inserted in the main body 16 and it is lowered to the first heating zone 25, which is indicated in FIG. 3A with a dashed line.

During dehydration, the preform is rotated about its axis and one or more drying gases, such as $Cl_2$, are supplied through the inlet 18 of the main body.

After dehydration, the preform 20 undergoes a consolidation process, shown in FIG. 3B, in which the preform is gradually lowered to a second heating zone, depicted in the figure with dashed line 26, maintained at a temperature higher than that of the first heating zone, e.g. at nearly 1500° C., by a second heater 27. For example, the second heater 27 has a ring shape and is attached to the outer circumference of the cylindrical muffle tube at a longitudinal section positioned downwards that surrounded by the first heater 17. To improve clarity, the first heater is not shown in FIG. 3B. The preform is down driven in the hot zone 26 at a given rate in order to fully consolidate the preform from the bottom to the top.

It is to be understood that a single heater can be used for both drying and consolidating the intermediate preform. In that case, after completion of the dehydration process, the heater is moved down the furnace and the temperature is increased up to the consolidation temperature.

In another embodiment (not shown in FIGS. 3A and 3B), the partially porous intermediate preform is subjected to bulk consolidation, in which the preform is inserted in a furnace body and remains stationary with respect to the vertical direction of the furnace body while a heater thermally coupled to the furnace body produces a gradient temperature along the vertical direction of the furnace. During bulk consolidation, the preform rotates about its longitudinal axis.

Subsequent to consolidation of the intermediate preform, an overcladding region is formed on the intermediate glass preform. Preferably, a soot overclad layer is formed by depositing soot material on the outer circumference of the intermediate glass preform by a flame hydrolysis process. Preferably the overcladding region is formed by an OVD process, in which the intermediate glass preform is placed on a horizontal lathe and deposition of silica soot takes place outside the rotating preform until the desired amount of material, which is related to the desired thickness of overclad region, is grown around the preform.

Once the desired thickness of the soot overclad layer is achieved on the intermediate glass preform, soot deposition for the formation of the soot overclad layer is terminated. The soot overclad layer extends from an interface of the intermediate glass preform to the outermost extent of the soot preform.

The resulting partially porous preform is sintered in a furnace, which can be a dehydration-consolidation furnace, by following a process as described with reference to FIGS. 3A and 3B. Consolidation produces a glass preform for an optical fibre.

Preferably, the overclad region is made of pure silica.

In another embodiment, the overclad layer may be formed by an APVD process, in which fine natural or synthetic silica particles are fed in a plasma flame and heat sintered onto the outer circumference of a rotating intermediate glass perform.

Figure 4:
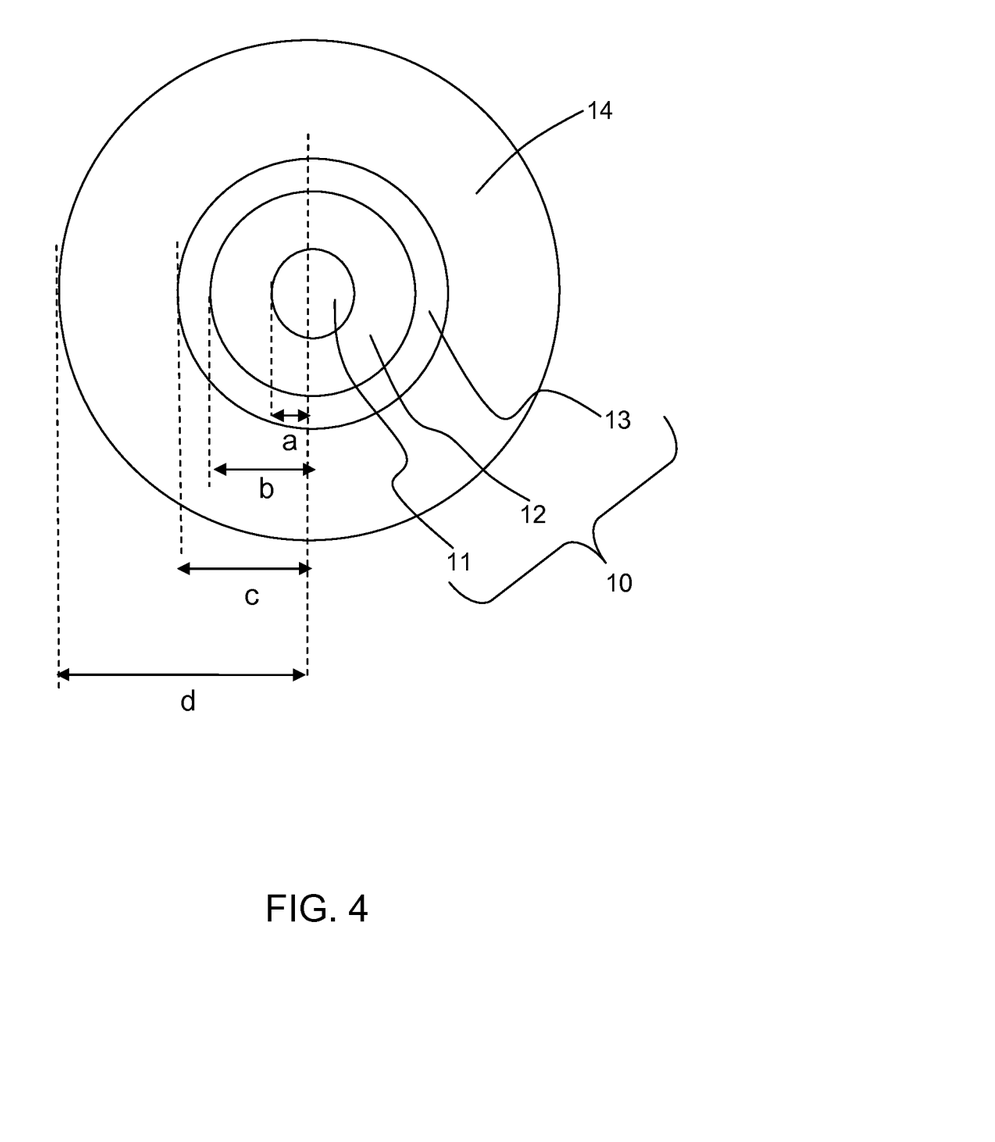
FIG. 4 is a schematic diagram of a cross-sectional view of a glass preform for an optical fibre.

FIG. 4 a schematic diagram of a cross-sectional view of a glass preform for an optical fibre. Same numbers of those of FIG. 2 are used to refer to like features. An overclad region 14 surrounds the intermediate clad region 13. The final core-to-clad ratio a/b can be selected so as to obtain, after drawing, an optical fibre having a standard outer diameter according to the specifications for single-mode transmissions, i.e. of about 125 μm. For example, a/d is of about 0.08.

Measurements (not shown) of the relative refractive index profile on a plurality of glass optical fibre preforms obtained by the method consistent with the present disclosure and having an overcladding of pure silica typically showed no significant discontinuity at the interface between the outer surface of the intermediate clad region and the overclad region implying that the glass quality of the two regions was substantially the same.

Following the formation of a glass preform for optical fibre, in the usual ways, the glass optical fibre preform is lowered at a relatively low speed into a drawing tower including a furnace having a hot zone where it is heated at a melting temperature (typically, at a temperature within the range 2000° C.-2200° C.) in the neck-down region, where glass softens and it is submitted to reduction in cross-sectional area to the desired cross-sectional area of the fibre. From the lower tip of the neck-down region, the optical fibre emerges where it is gripped by a mechanical device.

EXAMPLES

Comparative Example 1

Nearly 11,000 grams of silica soot were deposited in order to form a soot overclad layer by using an OVD process using as reactant octamethylcyclotetrasiloxane (OMCTS), referred also to as D4, onto a $GeO_2$-doped silica glass core rod with a step index profile. The glass rod was had a length of about 1.35 meter, a diameter of about 14.4 mm and a core-to-clad ratio a/b=0.343. The partially porous optical fibre preform was dehydrated by maintaining the preform in a hot zone of dehydration-consolidating furnace at about 1100° C., for 120 minutes in a 15 l/min He+0.9 l/min $Cl_2$ flow, with a rotational speed of 1 turn/min in order to assure axial symmetry. Then, the soot overclad layer was sintered by down driving the partially porous preform in a hot zone at 1500° C. of the consolidating furnace at a downfeed rate of 7 mm/min in an He+$Cl_2$ atmosphere having the same gas flow rate used in the dehydration, while rotating the preform with a rotational speed of 1 turn/min.

The preform was then placed for 12 h in a holding oven at 1000° C. with nitrogen.

The preform was drawn on a standard drawing tower. The outer diameter of the drawn fibre was maintained at 125±1 microns during drawing. Optical properties of several optical fibre length sections, which were wound up in respective bobbins were measured. In all examples herein described, the mode field diameter (MFD) of an optical fibre was measured according to the IEC 60793-1-45 (2001-07) standard, at a wavelength of 1310 nm. The average value of MFD was 9.21 μm, conforming to G.652 standard.

Spectral attenuation measurements were performed on several bobbins of optical fibres by using a commercial PK 2200 measurement bench. Measured average attenuation values were:
Attenuation @1310 nm=0.329 dB/km
Attenuation @1380 nm=0.341 dB/km
Attenuation @1550 nm=0.191 dB/km Comparative Example 2

Nearly 5500 grams of silica soot were deposited in order to form a soot overclad layer by using an OVD process ($SiCl_4$ reactant) onto a $GeO_2$-doped silica glass rod having a step index profile and a/b=0.292. The glass core rod had a length of about 0.95 m and outer diameter of about 13.4 mm. After deposition of the soot overclad layer, the preform was dehydrated by maintaining the preform in a hot zone at about 1100° C. of a dehydration/consolidation furnace, for 120 minutes in a 15 l/min He+0.9 l/min $Cl_2$ flow, with a rotational speed of 1 turn/min in order to assure axial symmetry. Then, the soot clad layer was sintered by down driving the preform in a hot zone at 1500° C. of the furnace with a 7 mm/min downfeed rate in the same He+$Cl_2$ atmosphere used for the dehydration process, while rotating the preform at a rotational speed of 1 turn/min.

The preform was then placed for 12 h in a holding oven at 1000° C. with nitrogen.

The preform was drawn on a standard drawing tower. The fiber diameter was maintained at 125±1 microns. Optical properties of several optical fibre length sections, which were wound up in respective bobbins were measured. The average MFD at 1310 nm was 9.15 μm, conforming to G.652 standard.

Spectral attenuation measurements were performed on several bobbins of optical fibres by using a commercial PK 2200 measurement bench. Measured average attenuation values were:

Attenuation @1310 nm=0.329 dB/km
Attenuation @1380 nm=0.294 dB/km
Attenuation @1550 nm=0.194 dB/km It is noted that selection of a lower a/b ratio with respect to that of Comparative example 1 allows to obtain an optical fibre with a very small water contribution, i.e. attenuation at a wavelength of 1380 nm.

Example 1

A soot intermediate clad layer was formed by depositing nearly 600 grams of silica soot by an OVD process (D4 reactant) onto a $GeO_2$-doped silica glass rod (of about 1.35 meter length and of about 14.4 mm diameter) with a core step index profile, a silica inner clad a and a first core-to-clad ratio, a/b, of 0.348. The obtained partially porous intermediate preform was inserted in a dehydration/consolidation furnace and maintained in a first hot zone of the furnace for dehydration at about 1100° C. for 120 minutes in a He+$Cl_2$ atmosphere with gas flow rate of 15 l/min He+0.9 l/min $Cl_2$. During the dehydration process, the intermediate preform was uniformly rotated at a rotational speed of 1 turn/min in order to assure axial symmetry. Subsequently, the soot intermediate clad layer was sintered by down driving the preform in a second hot zone at 1500° C. of the furnace at a downfeed rate of 7 mm/min in the same He+$Cl_2$ atmosphere used for the dehydration process, while rotating the preform at a rotational speed of 1 turn/min. The preform was then placed for 12 h in a holding oven at 1000° C. in which nitrogen was flown.

The resulting intermediate glass preform had a second core-to-clad ratio, a/c, of 0.23.

A soot overclad layer was formed by depositing nearly 10,800 grams of silica soot by OVD (D4 reactant) onto the intermediate glass preform. After deposition of the overclad soot, the partially porous preform was dried and sintered in the same He+$Cl_2$ atmosphere used in the dehydration/consolidating process of the intermediate preform and carried out by using the same process parameters.

The sintered preform was then placed for 12 h in a holding oven at 1000° C. with nitrogen and subsequently drawn on a standard drawing tower. The fibre outer diameter was maintained at 125±1 microns. Optical properties of several fibre length sections, which were wound up in respective bobbins were measured. Averaged values of the measured optical properties were:

Zero wavelength dispersion=1313 nm
MFD @1310 nm=9.41 μm
Cabled cut-off wavelength=1194 nm Spectral attenuation measurements were performed on several bobbins of optical fibres by using a commercial PK 2200 measurement bench. Measured average attenuation values were:

Attenuation @1310 nm=0.331 dB/km
Attenuation @1380 nm=0.290 dB/km
Attenuation @1550 nm=0.194 dB/km The use of the double cladding process starting with a core rod having an a/b ratio close to that of Comparative example 1 allows to obtain an optical fibre with very small water contribution.

Example 2

A soot intermediate clad layer was formed by depositing nearly 220 grams of silica soot via OVD ($SiCl_4$ reactant) onto a $GeO_2$-doped silica glass rod (of about 0.95 meter length and about 10 mm diameter) with a core step index profile, an inner clad, and a first core-to-clad ratio a/b of 0.377. The obtained partially porous intermediate preform was inserted in a dehydration/consolidation furnace and was submitted to a dehydration process followed by a consolidation process substantially under the same conditions used in previous Example 1.

The resulting intermediate glass preform has a second core-to-clad ratio a/c of 0.25.

A soot overclad layer was formed by depositing via OVD ($SiCl_4$ reactant) nearly 7500 grams of silica soot on the intermediate glass preform. The obtained optical fibre preform was dried and sintered as in Example 1. The optical fibre glass preform was then placed for 12 h in a holding oven at 1000° C. with nitrogen.

The optical fibre glass preform was drawn on a standard drawing tower down to an optical fibre having an outer diameter maintained at 125±1 microns. Optical properties of several fibre length sections, which were wound up in respective bobbins were measured. Averaged values of the measured optical properties were:

Zero wavelength dispersion=1328 nm
MFD @1310 nm=8.15
Cabled cut-off wavelength=1250 nm Spectral attenuation measurements were performed on several bobbins of optical fibres by using a commercial PK 2200 measurement bench. Measured average attenuation values were:

Attenuation @1310 nm=0.334 dB/km
Attenuation @1380 nm=0.288 dB/km
Attenuation @1550 nm=0.194 dB/km It can be noted that the use of the double overclad process according to the present Example, which starts from a core rod having an a/b ratio greater than that of Comparative example 1, allows to obtain a single-mode optical fibre with a very small water contribution.

The invention claimed is:

1. A method of manufacturing an optical fibre preform comprising:
    providing a glass core rod comprising a central core region of radius a and an inner clad region of external radius b to define a first core-to-clad ratio a/b;
    forming an intermediate glass preform comprising an intermediate clad region surrounding the inner clad region of the glass rod and having an external radius c to define a second core-to-clad ratio a/c, and overcladding the intermediate glass preform by forming an overclad region surrounding the intermediate clad region to form an optical fibre preform,
wherein the first core-to-clad ratio a/b is equal to or less than 0.40 and the second core-to-clad ratio a/c is of from 0.20 to 0.25.

2. The method of claim 1, wherein a/b is of from 0.34 to 0.40.

3. The method of claim 1, wherein a/b is of from 0.38 to 0.40.

4. The method of claim 1, wherein forming an intermediate glass preform comprises:
depositing soot material around the glass core rod by a flame hydrolysis process to form a soot intermediate clad layer, and
heating to consolidate the deposited soot intermediate clad layer to form an intermediate glass preform.

5. The method of claim 4, wherein the soot material forming a soot intermediate clad layer is silica soot.

6. The method of claim 4, wherein the flame hydrolysis deposition process is an outside vapour deposition process.

7. The method of claim 1, wherein the inner clad region is of pure silica.

8. The method of claim 1, wherein overcladding the intermediate glass preform comprises:
depositing soot material around the intermediate glass preform by a flame hydrolysis process to form a soot overclad layer, and
heating to consolidate the soot overclad layer so as to form an optical fibre preform.

9. The method of claim 8, wherein the flame hydrolysis deposition process is an outside vapour deposition process.

10. A method of manufacturing an optical fibre comprising:
forming an optical fibre preform according to claim 1, and
drawing the optical fibre preform to fabricate an optical fibre.

* * * * *